US012539863B2

United States Patent
Lin et al.

(10) Patent No.: US 12,539,863 B2
(45) Date of Patent: Feb. 3, 2026

(54) ENHANCED OCCUPANT DETECTION

(71) Applicant: Ford Global Technologies, LLC, Dearborn, MI (US)

(72) Inventors: Jun Lin, Westland, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 906 days.

(21) Appl. No.: 17/192,145

(22) Filed: Mar. 4, 2021

(65) Prior Publication Data
US 2022/0281460 A1 Sep. 8, 2022

(51) Int. Cl.
| B60W 40/08 | (2012.01) |
| B60W 50/14 | (2020.01) |
| G06F 18/24 | (2023.01) |
| G06V 20/59 | (2022.01) |

(52) U.S. Cl.
CPC ............ *B60W 40/08* (2013.01); *B60W 50/14* (2013.01); *G06F 18/24* (2023.01); *G06V 20/59* (2022.01); *B60W 2050/143* (2013.01); *B60W 2420/408* (2024.01); *B60W 2520/04* (2013.01); *B60W 2540/043* (2020.02)

(58) Field of Classification Search
CPC ................. B60W 40/08; B60W 50/14; B60W 2050/143; B60W 2420/52; B60W 2520/04; B60W 2540/043; G06K 9/6267; G06V 20/59
See application file for complete search history.

(56) References Cited

U.S. PATENT DOCUMENTS

| 6,922,622 B2 * | 7/2005 | Dulin .............. B60W 30/18054 701/45 |
| 9,847,004 B1 | 12/2017 | Lan et al. |
| 10,303,961 B1 | 5/2019 | Stoffel et al. |
| 2014/0288819 A1 * | 9/2014 | Kita ....................... G01C 21/10 701/409 |
| 2018/0065504 A1 * | 3/2018 | Lan .......... B60W 10/30 |
| 2018/0129202 A1 * | 5/2018 | Guo ..................... G05D 1/0061 |
| 2020/0079242 A1 * | 3/2020 | Yamamoto ............. G08B 21/22 |
| 2020/0353940 A1 * | 11/2020 | Kim ....................... G08B 21/24 |

FOREIGN PATENT DOCUMENTS

| CN | 111645613 A * | 9/2020 | ............... B60N 2/75 |
| FR | 3095859 A1 * | 11/2020 | ............. B60N 2/002 |
| JP | 2020149486 A * | 9/2020 | |
| KR | 102016251 B1 | 8/2019 | |
| WO | WO-2013133075 A1 * | 9/2013 | ............. G08B 21/22 |

OTHER PUBLICATIONS

English Translation for JP-2020149486-A (Year: 2020).*
English Translation for CN-111645613-A (Year: 2020).*
English Translation for FR-3095859-A1 (Year: 2020).*
English Translation for WO-2013133075-A1 (Year: 2013).*

* cited by examiner

*Primary Examiner* — Aniss Chad
*Assistant Examiner* — Nikki Marie M Molina
(74) *Attorney, Agent, or Firm* — Frank A. MacKenzie; Brooks Kushman P.C.

(57) ABSTRACT

Data are received from a vehicle sensor detecting a vehicle passenger and then determine that a vehicle has transitioned to a parked state from a non-parked state. Upon determining that the vehicle is in the parked state, a first output is provided to a user interface based on the data detecting the vehicle passenger prior to elapsing of an activation time of the vehicle sensor that collected the data of the vehicle passenger.

19 Claims, 4 Drawing Sheets

ENHANCED OCCUPANT DETECTION

BACKGROUND

Vehicles typically include one or more sensors to detect and monitor occupants of the vehicles. The sensors can collect data from a passenger cabin of the vehicle to detect and monitor the occupants. For example, a radar sensor can collect data to detect occupants in the passenger cabin. Based on the collected data, a computer of the vehicle can provide an output to the occupants.

DETAILED DESCRIPTION

A system includes a computer including a processor and a memory, the memory storing instructions executable by the processor to receive data from a vehicle sensor detecting a vehicle passenger and then determine that a vehicle has transitioned to a parked state from a non-parked state, and upon determining that the vehicle is in the parked state, provide a first output to a user interface based on the data detecting the vehicle passenger prior to elapsing of an activation time of the vehicle sensor that collected the data of the vehicle passenger.

The instructions can further include instructions to deactivate the vehicle sensor upon collecting the data of the vehicle passenger.

The instructions can further include instructions to reactivate the vehicle sensor to collect additional data detecting the vehicle passenger, and, upon detecting the vehicle passenger with the additional data, provide a second output to the user interface.

The vehicle sensor can be a radar and the instructions can further include instructions to detect the vehicle passenger based on a point cloud of radar data collected by the radar.

The instructions can further include instructions to, upon detecting no vehicle passenger based on the additional data, cease the second output.

The instructions can further include instructions to classify the vehicle passenger to one of an adult classification or a child classification and to provide the first output to the user interface when the vehicle passenger is classified to the child classification.

The instructions can further include instructions to identify a size of a point cloud of the received data and to classify the vehicle passenger based on the size of the point cloud.

The instructions can further include instructions to determine that the vehicle is in the parked state based on at least one of a position of a transmission gear, an activation status of a propulsion, or a door position of a vehicle door.

The instructions can further include instructions to cease the first output upon receiving user input to cease the first output.

The activation time of the sensor can be a time elapsed from providing an instruction to activate the sensor and receiving collected data from the sensor.

The instructions can further include instructions to actuate the sensor to collect the data about the vehicle passenger upon determining that a vehicle acceleration is below an acceleration threshold.

The instructions can further include instructions to actuate the vehicle sensor to detect the vehicle passenger upon activation of the vehicle.

A method includes receiving data from a vehicle sensor detecting a vehicle passenger and then determining that a vehicle has transitioned to a parked state from a non-parked state, and upon determining that the vehicle is in the parked state, providing a first output to a user interface based on the data detecting the vehicle passenger prior to elapsing of an activation time of the vehicle sensor that collected the data of the vehicle passenger.

The method can further include deactivating the vehicle sensor upon collecting the data of the vehicle passenger.

The method can further include reactivating the vehicle sensor to collect additional data detecting the vehicle passenger, and, upon detecting the vehicle passenger with the additional data, providing a second output to the user interface.

The vehicle sensor can be a radar, and the method can further include detecting the vehicle passenger based on a point cloud of radar data collected by the radar.

The method can further include, upon detecting no vehicle passenger based on the additional data, ceasing the second output.

The method can further include classifying the vehicle passenger to one of an adult classification or a child classification and providing the first output to the user interface when the vehicle passenger is classified to the child classification.

The method can further include identifying a size of a point cloud of the received data and classifying the vehicle passenger based on the size of the point cloud.

The method can further include determining that the vehicle is in the parked state based on at least one of a position of a transmission gear, an activation status of a propulsion, or a door position of a vehicle door.

The method can further include ceasing the first output upon receiving user input to cease the first output.

The method can further include actuating the sensor to collect the data about the vehicle passenger upon determining that a vehicle acceleration is below an acceleration threshold.

The method can further include actuating the vehicle sensor to detect the vehicle passenger upon activation of the vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Sensors used to detect occupants in a vehicle, e.g., sensors that are used to detect occupants that may remain when a vehicle is parked and/or powered down, may have an initial setup latency. That is, the occupant detection sensors may spend time activating and preparing to collect data, and the sensors may not be immediately ready to collect data upon initial instruction from a vehicle computer. During this time to activate the sensors, i.e., the activation time, a passenger of the vehicle may remain in the vehicle while an operator of the vehicle moves away from the vehicle. Maintaining activation of the sensors during operation of the vehicle draws power from a vehicle battery, and the computer can determine to deactivate the occupant detection sensors during operation of the vehicle to reduce power consumption and reactivate the occupant detection sensors once the vehicle is parked.

The computer can, upon activation of the vehicle, collect data with the sensors to detect passengers in the vehicle and store the collected data in a memory. Then, when the vehicle transitions to a parked state, the computer can initiate the sensors to detect whether a passenger remains in the vehicle. While the sensors begin activation, the computer can determine whether there are stored data indicating a passenger and provide an output to an operator of the vehicle to indicate that the passenger may still be in the vehicle. That is, during the activation time of the sensors, the computer can provide the output to the operator until the sensors are fully activated and can detect whether the passenger is still in the vehicle. Thus, the computer can obtain data about occupancy of the vehicle during activation of the occupant detection sensors while reducing overall power consumption by the sensors.

Figure 1:
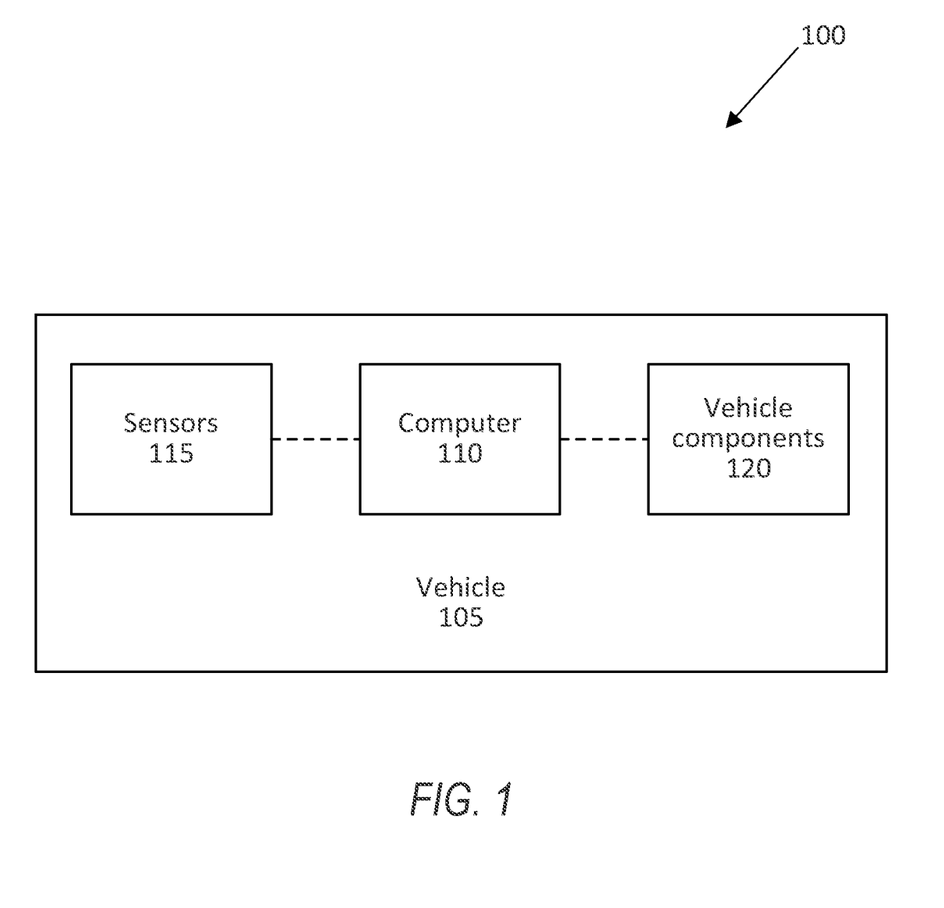
FIG. 1 is a block diagram of an example system for detecting occupants in a vehicle.

FIG. 1 illustrates an example system 100 for detecting occupants in a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in computer 110.

In addition, the computer 110 may be programmed for communicating with a network, which may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at a server. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

Figure 2:
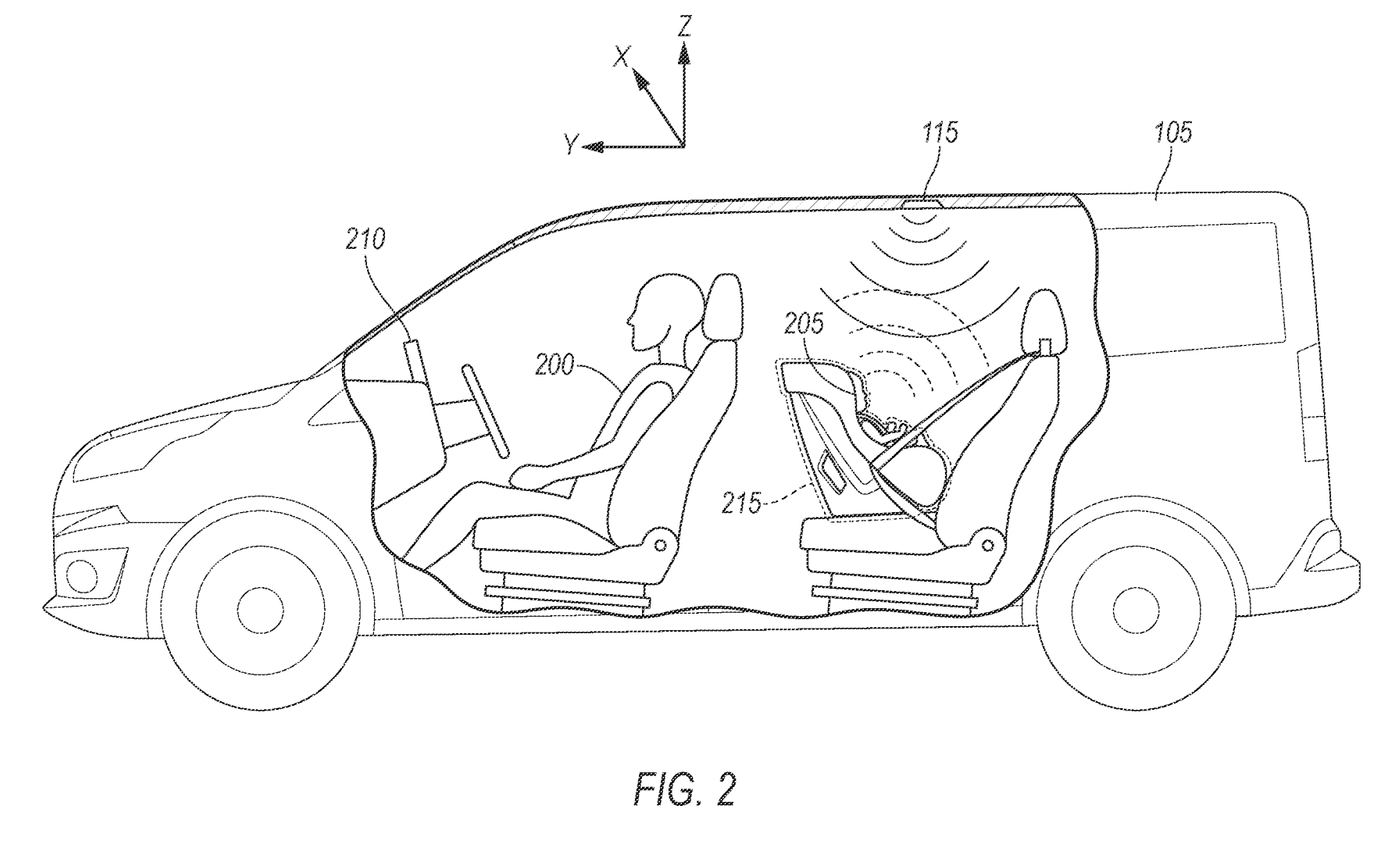
FIG. 2 is a side view of an example vehicle in which occupants may be detected.

FIG. 2 is a side view of an interior of a vehicle 105. An operator 200 can operate the vehicle 105, and a passenger 205 can also be in the vehicle 105. The vehicle 105 includes a user interface, such as a display screen 210. A "user interface" in this context is one or more devices by which the computer 110 can provide information to the operator 200 and to which the operator 200 can provide input to the computer 110. For example, the user interface can be the display screen 210. The display screen 210 displays messages to the operator 200. The display screen can be, e.g., a monitor that adjusts light emitted from the display screen to display messages. For example, the display screen can display a message from the computer 110 indicating a current fuel level of a fuel tank of the vehicle 105 and a request to refuel the fuel tank. Alternatively or additionally, the user interface can be a portable device in possession of the operator 200, e.g., a phone, a tablet, a laptop computer, etc.

The vehicle 105 includes an occupant detection subsystem. The occupant detection subsystem can detect occupants in a passenger cabin of the vehicle 105. The occupant detection subsystem includes one or more occupant detection sensors 115. The occupant detection sensor 115 can collect data in the passenger cabin to determine whether the passenger 205 is in the vehicle 105. The sensor 115 can be, e.g., a radar, a lidar, an ultrasonic transducer, etc. The sensor 115 can be a dedicated sensor 115 that the computer 110 actuates to detect occupants. To reduce power consumption by the sensor 115, the computer can deactivate the sensor 115 while the vehicle 105 is in motion and reactivate the sensor 115 once the vehicle 105 has parked. Then, the computer 110 can activate the sensor 115 to detect the occupants. The sensor 115 has an activation time, i.e., a time elapsed from the computer 110 providing an instruction to activate the sensor 115 and determining whether a passenger 205 is present based on data collected by the sensor 115.

The data from the occupant detection sensor 115 can be a data point cloud 215, e.g., from a radar, a stereo camera, an ultrasonic transducer, a lidar, etc. A "data point cloud" is a set of data in a three-dimensional coordinate system, e.g., a three-dimensional rectangular coordinate system with a lateral axis X, a longitudinal axis Y, and a vertical axis Z. That is, the sensor 115 can collect data as a set of three-dimensional data points, the three-dimensional data points forming a volume in the coordinate system. The volume defined by the set of three-dimensional data points is the data point cloud 215. For example, when the occupant detection sensor 115 is a radar, the occupant detection sensor 115 can emit radar waves and determine the point cloud 215 based on the flight path of the radar waves reflected from the passenger 205.

The computer 110 can, based on the data point cloud, classify an object detected by the sensor 115. For example, the computer 110 can determine a volume of an enclosed surface enclosing the data point cloud 215. The computer 110 can determine the volume based on a conventional data point cloud volumetric technique, e.g., Pix4Dmapper, octree analysis, a three-dimensional bounding box, etc. For example, the computer 110 can determine a respective maximum and minimum value along each axis X, Y, Z, generating six points. Based on the six points, the computer 110 can generate a three-dimensional bounding box that is a rectangular prism enclosing the data point cloud 215. The computer 110 can determine the volume of the three-dimensional bounding box based on a conventional volume equation for a rectangular prism. The computer 110 can compare the volume of the three-dimensional bounding box to a lookup table or the like that classifies detected volumes of three-dimensional bounding boxes to types of objects. For example, the lookup table or the like can include a range of volumes that are classified to an "adult" type of object, and the lookup table or the like can include a second range of volumes that are classified to a "child" type of object.

The computer 110 can actuate the occupant detection subsystem upon activation of the vehicle 105. The computer 110 can determine that the vehicle 105 is activated based on data from one or more components 120. For example, the computer 110 can determine that the vehicle 105 is activated when a propulsion is powered on. Upon actuation of the occupant detection subsystem, the computer 110 can actuate the sensor 115 to collect data about the passenger 205. The data collected by the sensor 115 may be unreliable when the vehicle 105 is accelerating or otherwise unstable from vibrations from a roadway. That is, acceleration and/or vibrations can affect a flight path of radar waves emitted from the occupant detection sensor 115, and the data determined from these affected radar waves may indicate false positive or false negative detections of the passenger 205, so the computer 110 can determine to actuate the sensor 115 when a vehicle acceleration is below an acceleration threshold. For example, the computer 110 can actuate the sensor 115 to collect the data about the passenger 205 when the vehicle 105 is actuated but has not begun to move, e.g., at the beginning of a trip.

In another example, the computer 110 can collect acceleration data from an accelerometer while the vehicle 105 is in motion and, when the acceleration data indicate that the vehicle acceleration is below the threshold, actuate the sensor 115 to collect the data about the passenger 205. The computer 110 can determine the vehicle acceleration with, e.g., an accelerometer. The vehicle acceleration detected by the computer 110 can include, e.g., three-dimension accelerations such as a lateral acceleration, a longitudinal acceleration, and vertical acceleration. That is, the accelerometer can determine respective accelerations in each direction of the three-dimensional coordinate system described above, and when each acceleration in the three directions of the three-dimensional coordinate system is below respective thresholds, the computer 110 can determine that the data from the occupant detection sensor 115 is reliable The threshold can be based on empirical testing of test vehicles 105 accelerating at a plurality of accelerations, the test vehicles 105 collecting data with test sensors 115 and determining a reliability measure of the collected data for each test acceleration. The reliability measure can be a measure of similarity between the data collected while the vehicle is accelerating and reference data collected while the vehicle is not accelerating. For example, the reliability measure can be a ratio between a detected volume of the three-dimensional bounding box determined while the vehicle 105 is accelerating and a reference volume of the three-dimensional bonding box determined when the vehicle 105 is not accelerating. The threshold can be a maximum acceleration at which the reliability measure indicates that the data collected by the sensor 115 indicate the vehicle passenger 205 detected by the sensor 115 when the vehicle 105 is not accelerating. Upon collecting the data of the vehicle passenger 205, the computer 110 can deactivate the sensor 115, reducing power consumption by the sensor 115.

The computer 110 can provide an output to the user interface, such as the display screen 210, to alert the operator 200. The output can be, e.g., an audio alert through a speaker or to a portable device, a visual alert to the display or the portable device, etc. The computer 110 can provide the output to the operator 200 to alert the operator that the passenger 205 is still in the vehicle 105.

The computer 110 can continue to provide the output until receiving user input to cease the output or upon determining that the passenger 205 is no longer in the vehicle 105. That is, the operator 200 can provide input to the user interface, such as the display screen 210, to cease the output. The user input is an input provided by the user to instruct the computer to cease the output. For example, the user input can be a haptic or touch input to the display screen 210. In another example, the user input can be a voice command instructing the computer 110 to cease the input. Alternatively or additionally, the sensor 115 can collect data from the interior of the vehicle 105 and, upon determining that the passenger 205 is no longer in the vehicle 105, the computer 110 can cease the output.

The computer 110 can determine to provide a first output upon determining that the vehicle 105 has transitioned from a non-parked state to a parked state. In this context, a "parked state" is a state in which the vehicle 105 is stopped and about to be powered off, ending a current trip, and a "non-parked state" is a state that is different than the parked state. When the vehicle 105 is in the parked state, the operator 200 can exit the vehicle 105. The computer 110 can determine that the vehicle 105 is in the parked state based on data collected from one or more components 120. For example, the computer 110 can receive data from an internal network (e.g., a CAN bus) indicating that a transmission gear is in a "Park" position. In another example, the computer 110 can receive data from a door sensor indicating that a vehicle door is in an opened position, indicating that the vehicle 105 is parked. In yet another example, the computer 110 can receive data from a propulsion indicating an activation status of the propulsion, i.e., whether the propulsion is activated. When the activation status of the propulsion is "inactive," i.e., the propulsion is powered off, the computer 110 can determine that the vehicle 105 is in the parked state.

The computer 110 can determine to provide the first output upon determining that the sensor 115 collected data detecting the passenger 205. As described above, upon actuation of the vehicle 105 or when the acceleration of the vehicle 105 is below the acceleration threshold, the computer 110 can actuate the sensor 115 to collect data detecting the passenger 205 and store the data in the memory. When the computer 110 determines that the vehicle is in the parked state and there is stored data in the memory detecting the passenger 205, the computer 110 can provide the first output to the user interface.

After transitioning to the parked state, the computer 110 can reactivate the sensor 115 to collect additional data in the vehicle 105. The computer 110 can determine to provide a second output while the sensor 115 is reactivated. That is, during the activation time, the sensor 115 prepares and begins to collect data, and the computer 110 uses some time to process the collected data to detect the passenger 205. Upon elapsing of the activation time and detecting the passenger 205 in the vehicle 105, the computer 110 can determine to provide the second output to the user interface. Alternatively or additionally, upon determining that an elapsed time since providing the first output exceeds a time threshold, the computer 110 can provide the second output to the user interface. The time threshold can be based on the activation time, e.g., equal to the activation time, one second less than the activation time, greater than the activation time, etc. The second output can be an audio output with a greater volume than the first output and/or a visual output with a greater brightness or a different color than the first output.

The sensor 115 can collect data in the passenger cabin to attempt to detect the passenger 205. As described above, the sensor 115 can collect a data point cloud 215, and the computer 110 can, based on the data point cloud 215, determine whether the passenger 205 is in the vehicle 105. Upon detecting the passenger 205 with the additional data collected by the sensor 115, the computer 110 can provide a third output to the user interface. The third output can be an audio output with a greater volume than the second output and/or a visual output with a greater brightness or a different color than the second output. Additionally, if an elapsed time from providing the third output exceeds the time threshold or a different time threshold, the computer 110 can determine to provide a fourth output, e.g., an audio output with a greater volume than the third output and/or a visual output with a greater brightness or a different color than the third output. That is, the computer 110 can continue to provide escalating outputs to the user interface until the operator 200 provides input to cease the outputs. Alternatively or additionally, if the computer 110 detects no passenger 205 based on the data point cloud 215 collected by the sensor 115, the computer 110 can cease the outputs to the user interface.

Figure 3:
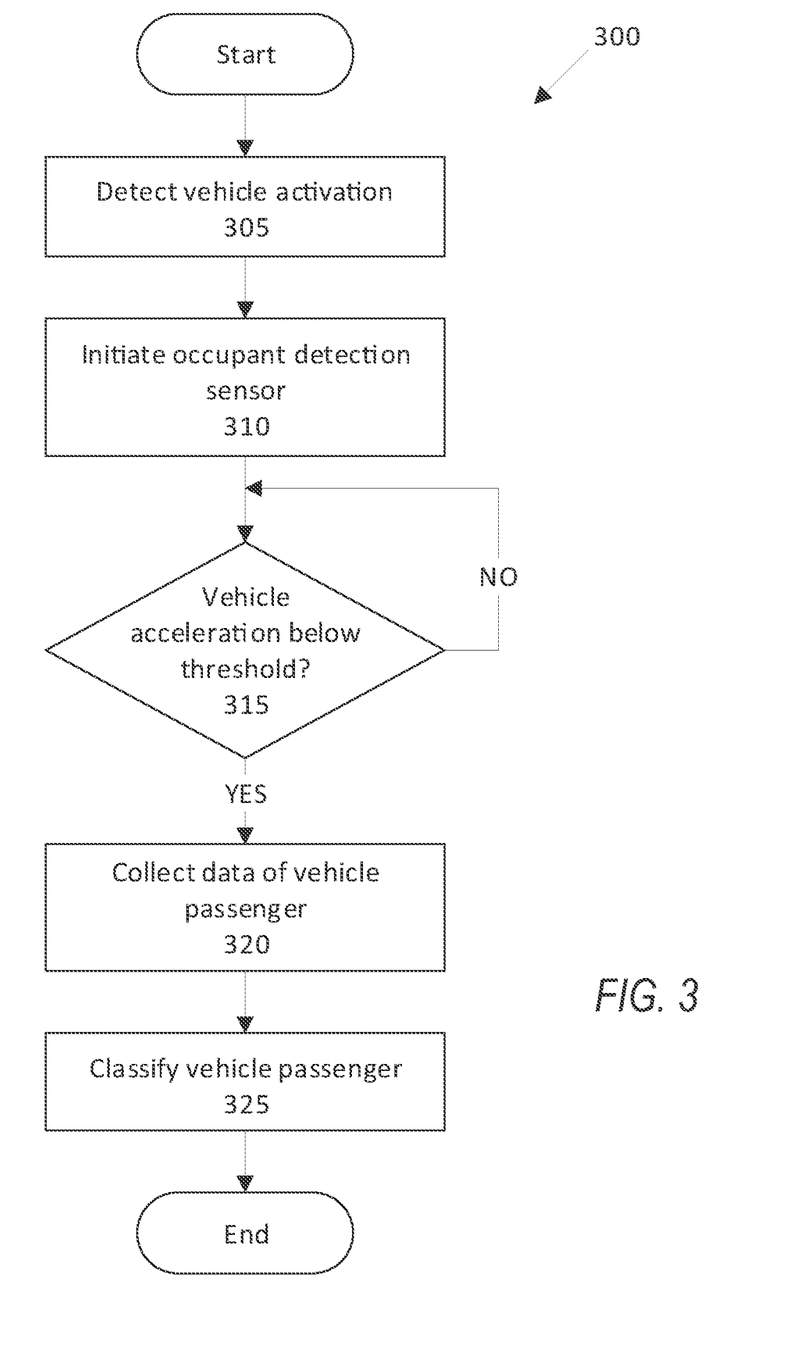
FIG. 3 is a block diagram of an example process for identifying a passenger of the vehicle.

FIG. 3 is a block diagram of an example process 300 for identifying a passenger 205 of a vehicle 105. The process 300 begins in a block 305, in which a computer 110 of the vehicle 105 detects that the vehicle 105 is being activated by an operator 200. As described above, the computer 110 can determine that the vehicle 105 is being activated based on data from one or more components 120. For example, the computer 110 can receive data from a propulsion indicating that an activation status of the propulsion is "active."

Next, in a block 310, the computer 110 initiates an occupant detection sensor 115. As described above, the occupant detection sensor 115 is a dedicated sensor 115 of an occupant detection subsystem that collects data in a passenger cabin of the vehicle 105 to determine whether a passenger 205 is in the vehicle 105. The occupant detection sensor 115 has an activation time, i.e., an amount of time from initiation for the sensor 115 to activate until the computer 110 processes data collected by the sensor 115 and detects the passenger 205. That is, the computer 110 can provide an instruction to the occupant detection sensor 115 to activate, and the sensor 115 can begin activation to prepare to collect data. When the sensor 115 is ready to collect data, the sensor 115 can send a message to the computer 110 indicating that the sensor 115 is ready to collect data.

Next, in a block 315, the computer 110 determines whether a vehicle acceleration is below an acceleration threshold. As described above, when the vehicle 105 is accelerating or unstable from vibrations, the data collected by the occupant detection sensor 115 may be unreliable. That is, acceleration and/or vibrations can affect a flight path of radar waves emitted from the occupant detection sensor 115, and the data determined from these affected radar waves may indicate false positive or false negative detections of the passenger 205. The computer 110 can determine to collect data with the occupant detection sensor 115 when the vehicle acceleration is below a threshold, e.g., when the vehicle 105 is stopped upon activation prior to moving to a destination. The computer 110 can determine the vehicle acceleration with, e.g., an accelerometer. The vehicle acceleration detected by the computer 110 can include, e.g., three-dimension accelerations such as a lateral acceleration, a longitudinal acceleration, and vertical acceleration. That is, the accelerometer can determine respective accelerations in each direction of a three-dimensional coordinate system, as described above, and when the respective accelerations in the three directions of the three-dimensional coordinate system are each below respective thresholds, the computer 110 can determine that the data from the occupant detection sensor 115 is reliable. If the computer 110 determines that the vehicle acceleration is below the threshold, the process 300 continues in a block 320. Otherwise, the process 300 remains in the block 315.

In the block 320, the computer 110 instructs the occupant detection sensor 115 to collect data of the vehicle passenger 205. As described above, the occupant detection sensor 115 can collect a data point cloud 215, i.e., a set of data points in a three-dimensional coordinate system. That is, the sensor 115 can collect data in the three-dimensional coordinate system as a set of three-dimensional coordinates in the coordinate system forming a volume, the volume of data points being the data point cloud 215.

Next, in a block 325, the computer 110 classifies the vehicle passenger 205 based on the collected data. As described above, the computer 110 can classify the passenger 205 to one of an "adult" classification or a "child" classification based on the data. For example, the computer 110 can determine a three-dimensional bounding box enclosing the data point cloud 215, and, based on the volume of the bounding box, the computer 110 can classify the passenger 205. The computer 110 stores the data and the classification in a memory. Following the block 325, the process 300 ends.

Figure 4:
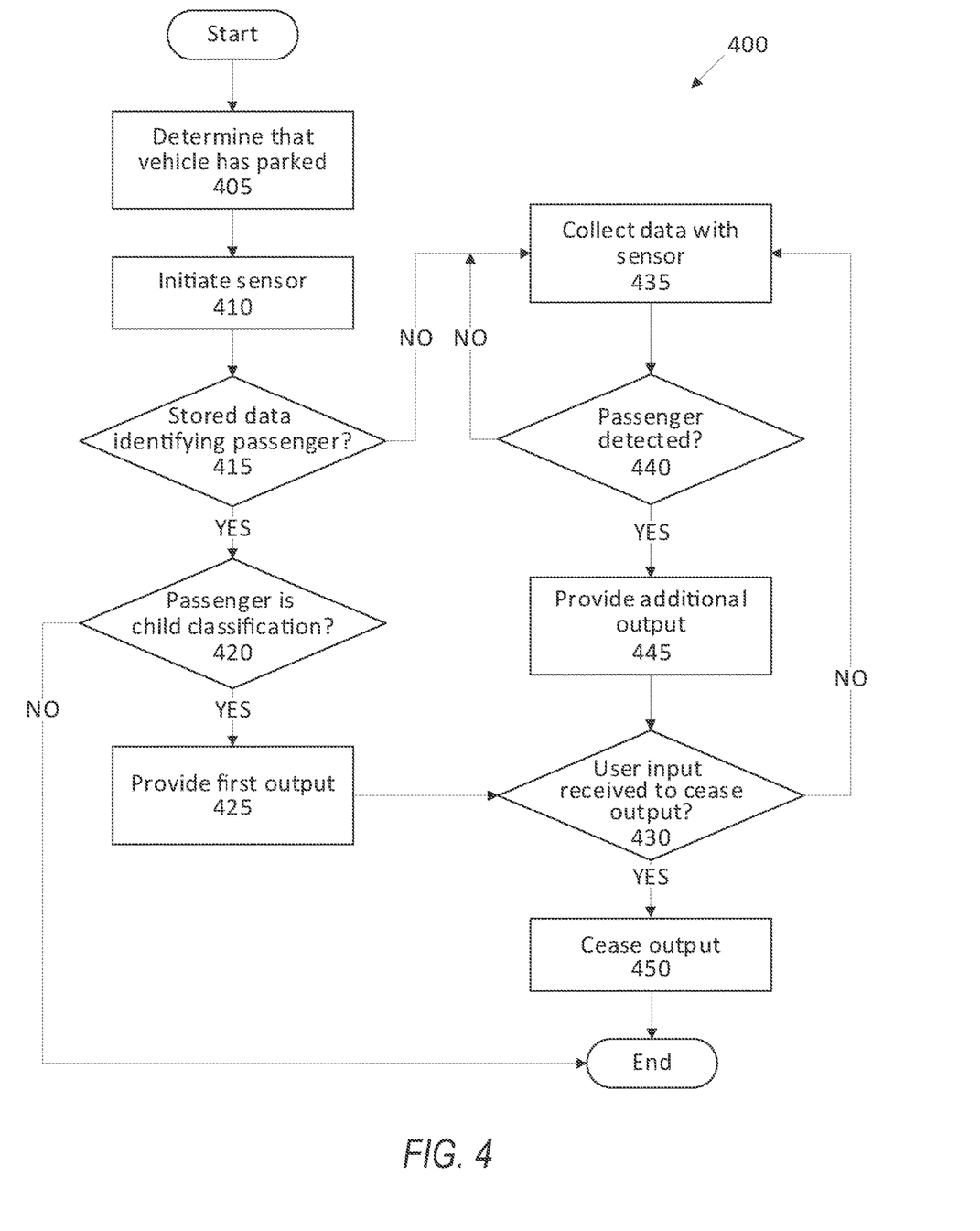
FIG. 4 is a block diagram of an example process for providing an output based on the identification of the passenger.

FIG. 4 is a block diagram of an example process 400 for providing outputs to a user interface to alert an operator 200 that a passenger 205 is in a vehicle 105. The process 400 begins in a block 405, in which a computer 110 determines that the vehicle 105 has transitioned from a non-parked state to a parked state. As described above, the computer 110 can collect data from one or more components 120 determine whether the vehicle 105 has transitioned to the parked stated. For example, the computer 110 can collect data from a propulsion and determine that the vehicle 105 is in the parked stated when the data indicate that the propulsion is deactivated.

Next, in a block 410, the computer 110 initiates a sensor 115 of an occupant detection subsystem. As described above, activating the sensor 115 takes a period of time as the sensor 115 actuates parts to prepare for collecting data. During this time to activate the sensor 115, i.e., the activation time, the operator 200 may move from the vehicle 105 while the passenger remains in the vehicle 105. The computer 110 initiates the sensor 115 to prepare to collect data while determining, based on previously collected data, whether the passenger 205 is in the vehicle 105.

Next, in a block 415, the computer 110 determines whether there are stored data identifying the passenger 205. As described above and shown in FIG. 3, the computer 110 can actuate a sensor 115 in an occupant detection subsystem when the acceleration of the vehicle 105 is below a threshold to collect data about the passenger 205. For example, the sensor 115 can collect a data point cloud of the passenger 205. The computer 110 can classify the passenger based on the collected data and can store the collected data in a memory. Because the activation time of the sensor 115 has not elapsed, the computer 110 can use the stored data to detect the passenger 205 while the sensor 115 initiates. If the computer 110 determines that there are stored data identifying the passenger 205, the process 400 continues in a block 420. Otherwise, the process 400 continues in a block 435.

In the block 420, the computer 110 determines whether the passenger 205 is classified to the "child" classification. As described above, the computer 110 can classify the collected data to one of an "adult" classification or a "child" classification. For example, the computer 110 can identify a bounding box enclosing the data point cloud and, based on the volume of the bounding box, the computer 110 can determine the classification of the passenger 205. If the computer 110 determines that the passenger 205 is classified to the "child" classification, the process 400 continues in a block 425. Otherwise, the process 400 ends.

In the block 425, the computer 110 provides a first output to a user interface. As described above, the first output can be a visual and/or audio output intended to attract the attention of the operator 200 to retrieve the passenger 205. For example, the first output can be a message displayed on a display screen 210 in the vehicle 105. In another example, the first output can be a message sent to a portable device of the operator 200.

Next, in a block 430, the computer 110 determines whether the operator 200 has provided user input to cease the output. As described above, the operator 200 can provide an input to the user interface indicating that the operator 200 has acknowledged the output and the detection of the passenger 205. For example, the operator 200 can provide a haptic (i.e., touch) input to the display screen 210 instructing the computer 110 to cease the output. In another example, the operator 200 can provide an audio command to instruct the computer 110 to cease the output. If the computer 110 determines that the operator 200 has provided user input to cease the output, the process 400 continues in a block 450. Otherwise, the process 400 continues in a block 435.

In the block 435, the sensor 115 collects data in the vehicle 105. The sensor 115 can collect a data point cloud 215 in the interior of the vehicle 105. For example, when the sensor 115 is a radar, the sensor 115 can emit radar waves and determine the point cloud 215 based on the flight path of the radar waves reflected from the passenger 205.

Next, in a block 440, the computer 110 determines whether the passenger 205 is detected in the vehicle 105 based on the data from the sensor 115. As described above, the computer 110 can assign the data from the sensor 115 to a classification, such as an "child" classification. When the data are assigned to the "child" classification, the computer 110 can determine that the passenger 205 is in the vehicle 105 and provide an additional output. Upon determining the classification based on the first data collected by the sensor 115 after initiation, the activation time ends, as described above. If the computer 110 detects the passenger 205 in the vehicle 105, the process 400 continues in a block 445. Otherwise, the process 400 returns to the block 435 to collect additional data.

In the block 445, the computer 110 provides an additional output to the user interface. Because the passenger 205 is detected in the vehicle 105, the computer 110 can provide the additional output at a greater intensity than a previously provided output, e.g., the first output. As described above, the computer 110 can provide the additional output as a visual and/or audio output that has a greater intensity that the first or a previously provided output to attract the attention of the operator 200. For example, the computer 110 can provide the additional output as a message on the display screen 210 in a bigger font size or with a different color than the first or a previously provided output. In another example, the computer 110 can provide the additional output as an audio output at a greater volume than the first or a previously provided output. Following the block 445, the process 400 returns to the block 430.

In the block 450, following from the block 430 as described above, the computer 110 determines to cease the output. When the output is a visual output to a display screen 210, the computer 110 can deactivate the display screen 210. When the output is an audio output, the computer 110 can deactivate the speaker providing the audio output. Following the block 450, the process 400 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:
   receive data from a vehicle sensor detecting a vehicle passenger while the vehicle is in a non-parked state;
   then determine that a vehicle has transitioned to a parked state from the non-parked state, wherein the vehicle sensor is deactivated upon the transition to the parked state; and
   upon determining that the vehicle is in the parked state, provide a first output to a user interface based on the data detecting the vehicle passenger received prior to the transition to the parked state and prior to elapsing of an activation time of the vehicle sensor in the parked state; wherein the activation time of the sensor is a time elapsed from providing an instruction to activate the sensor and receiving collected data from the sensor.

2. The system of claim 1, wherein the instructions further include instructions to deactivate the vehicle sensor upon collecting the data of the vehicle passenger.

3. The system of claim 1, wherein the instructions further include instructions to reactivate the vehicle sensor after the transition to the parked state, and, after the elapsing of the activation time, to collect additional data detecting the vehicle passenger, and, then, upon detecting the vehicle passenger with the additional data, provide a second output to the user interface.

4. The system of claim 3, wherein the vehicle sensor is a radar and the instructions further include instructions to detect the vehicle passenger based on a point cloud of radar data collected by the radar.

5. The system of claim 3, wherein the instructions further include instructions to, upon detecting no vehicle passenger based on the additional data, cease the second output.

6. The system of claim 1, wherein the instructions further include instructions to classify the vehicle passenger to one of an adult classification or a child classification and to provide the first output to the user interface when the vehicle passenger is classified to the child classification.

7. The system of claim 6, wherein the instructions further include instructions to identify a size of a point cloud of the received data and to classify the vehicle passenger based on the size of the point cloud.

8. The system of claim 1, wherein the instructions further include instructions to determine that the vehicle is in the parked state based on at least one of a position of a transmission gear, an activation status of a propulsion, or a door position of a vehicle door.

9. The system of claim 1, wherein the instructions further include instructions to cease the first output upon receiving user input to cease the first output.

10. The system of claim 1, wherein the instructions further include instructions to actuate the sensor to collect the data about the vehicle passenger upon determining that a vehicle acceleration is below an acceleration threshold.

11. The system of claim 1, wherein the instructions further include instructions to actuate the vehicle sensor to detect the vehicle passenger upon activation of the vehicle.

12. A method, comprising:
    receiving data from a vehicle sensor detecting a vehicle passenger while the vehicle is in a non-parked state;

determining that a vehicle has transitioned to a parked state from the non-parked state, wherein the vehicle sensor is deactivated upon the transition to the parked state; and upon determining that the vehicle is in the parked state, providing a first output to a user interface based on the data detecting the vehicle passenger received prior to the transition to the parked state and prior to elapsing of an activation time of the vehicle sensor in the parked state; wherein the activation time of the sensor is a time elapsed from providing an instruction to activate the sensor and receiving collected data from the sensor.

13. The method of claim 12, further comprising deactivating the vehicle sensor upon collecting the data of the vehicle passenger.

14. The method of claim 12, further comprising reactivating the vehicle sensor after the transition to the parked state, and, after the elapsing of the activation time, collecting additional data of the vehicle passenger, and, then, upon detecting the vehicle passenger with the additional data, providing a second output to the user interface.

15. The method of claim 14, wherein the vehicle sensor is a radar and the method further comprises detecting the vehicle passenger based on a point cloud of radar data collected by the radar.

16. The method of claim 14, further comprising, upon detecting no vehicle passenger based on the additional data, ceasing the second output.

17. The method of claim 12, further comprising classifying the vehicle passenger to one of an adult classification or a child classification and providing the first output to the user interface when the vehicle passenger is classified to the child classification.

18. The method of claim 17, further comprising identifying a size of a point cloud of the received data and classifying the vehicle passenger based on the size of the point cloud.

19. The method of claim 12, further comprising determining that the vehicle is in the parked state based on at least one of a position of a transmission gear, an activation status of a propulsion, or a door position of a vehicle door.

* * * * *